US007253240B2

(12) United States Patent
Hintzer et al.

(10) Patent No.: US 7,253,240 B2
(45) Date of Patent: Aug. 7, 2007

(54) EXPLOSION-FREE PROCESS FOR THE PRODUCTION OF POLYTETRAFLUOROETHYLENE

(75) Inventors: Klaus Hintzer, Kastl (DE); Albert Killich, Burgkirchen (DE); Gernot Löhr, Burgkirchen (DE); Hans-Josef Staudt, Haiming (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/415,250

(22) PCT Filed: Nov. 29, 2001

(86) PCT No.: PCT/US01/44726

§ 371 (c)(1),
(2), (4) Date: Apr. 25, 2003

(87) PCT Pub. No.: WO02/44226

PCT Pub. Date: Jun. 6, 2002

(65) Prior Publication Data

US 2004/0014886 A1  Jan. 22, 2004

(30) Foreign Application Priority Data

Nov. 30, 2000 (DE) ................ 100 59 735

(51) Int. Cl.
*C08F 114/18* (2006.01)
(52) U.S. Cl. .............. 526/242; 524/544; 524/793
(58) Field of Classification Search ........... 526/242; 524/544, 793
See application file for complete search history.

(56) References Cited

U.S. PATENT DOCUMENTS

| 2,965,595 | A |  | 12/1960 | Brinker et al. |  |
|---|---|---|---|---|---|
| 3,345,317 | A | * | 10/1967 | Hoashi | 524/742 |
| 3,462,401 | A | * | 8/1969 | Kometani et al. | 526/206 |
| 3,632,847 | A |  | 1/1972 | Hartwimmer |  |
| 3,642,742 | A |  | 2/1972 | Carlson |  |
| 4,025,481 | A | * | 5/1977 | Tournut et al. | 524/793 |
| 4,036,802 | A |  | 7/1977 | Poirier |  |
| 4,391,940 | A |  | 7/1983 | Kuhls et al. |  |
| 5,001,278 | A | * | 3/1991 | Oka et al. | 568/615 |
| 5,276,261 | A | * | 1/1994 | Mayer et al. | 524/546 |
| 5,670,593 | A | * | 9/1997 | Araki et al. | 526/245 |
| 6,429,258 | B1 | * | 8/2002 | Morgan et al. | 524/805 |
| 6,716,942 | B1 | * | 4/2004 | Saito et al. | 526/242 |
| 2002/0082336 | A1 |  | 6/2002 | Dworak et al. |  |

FOREIGN PATENT DOCUMENTS

| BE | 678 637 | 4/1965 |
| EP | 0 664 209 A1 | 7/1995 |
| JP | 40 021438 A | 9/1965 |
| JP | 44 027598 A | 11/1969 |

OTHER PUBLICATIONS

*Journal of Applied Polymer Science*, vol. 14, pp. 79-88, (1970), "Some Rheological Properties of Molten Polytetrafluoroethylene", Ajroldi et al.

* cited by examiner

*Primary Examiner*—David W. Wu
*Assistant Examiner*—Henry S. Hu

(57) ABSTRACT

Use of non-water-soluble organic fluorinated compounds, which are gaseous under the polymerization conditions and act as chain transfer agent in the gas phase, as explosion suppressors in the emulsion polymerization of tetrafluoroethylene.

4 Claims, No Drawings

EXPLOSION-FREE PROCESS FOR THE PRODUCTION OF POLYTETRAFLUOROETHYLENE

The invention pertains to a safe technology for the production of polytetrafluoroethylene (PTFE) through aqueous emulsion polymerization of tetrafluoroethylene (TFE), whereby a significant cause of explosions is avoided.

The radical polymerization of TEE to PTFE in the aqueous medium is carried out according to two different processes, namely, suspension polymerization (S-process) and so-called emulsion polymerization (E-process). The E-process is more susceptible to explosions than the S-process. With the S-process, little or no emulsifier with a non-telogenic effect is used, but with the E-process, a relatively large amount of this emulsifier is used. The products differ accordingly:

The S-process leads to a relatively coarse-particle suspension of PTFE that is essentially processed using the sintering process, whereas the E-process leads to a colloidal PTFE dispersion with latex particles having a particle size of up to about 250 nm that can either be used—directly or after being concentrated—for coatings, for example, or else following isolation of the solids. In the latter case, the "fine resin powder" is then mixed into a paste with organic liquids such as benzene, and extruded into formed objects such as strands, tubes, hoses, or strips, which—following removal of the liquid—are sintered or stretched into flat sheets. For that reason, this form of PTFE is also known as "pasteware".

An extremely high molecular weight of up to $10^8$ g/mol is absolutely essential for good mechanical properties of the end products. The molecular weight is defined in this case by means of the "specific standard gravity" (SSG, ASTM D 1457-66). For the products made via E-polymerization according to the invention, it amounts to less than 2.20 g/cm$^3$, preferably 2.19 to 2.14 g/cm$^3$. The melt viscosity is $10^6$ to $10^{13}$ Pa.s, measured according to the creep test per Ajroldi, J. Appl. Polym. Sci., 14 (1970), p. 79 ff., which means that the products cannot be melt-processed.

According to ISO 12086, PTFE can contain up to 0.1 mol-% of other monomers. In terms of melt processability, this kind of "modified" PTFE behaves like the homopolymers. They exhibit a melt viscosity of >$10^6$ Pa.s, preferably >$10^7$ Pa.s.

There is also a melt-processable, very low molecular weight form of the PTFE, the so-called "micropowder". Here, the molecular weight is markedly below $10^6$ g/mol. Such products are made, first, through the decomposition of high-molecular products by means of heat or irradiation, or second, through polymerization by using chain transfer agents (or "regulators"). Micropowder has poor mechanical properties. It is crumbly and brittle. For that reason, formed end products made from micropowder cannot be produced. It is, for example, suitable as an additive to polyacetates (BP-A-0 664 209) in order to improve the sliding properties.

The aqueous E-polymerization of TEE to PTFE has been known for a long time. Despite the long experience with this process on a commercial scale and the corresponding equipping of the apparatus with bursting disks, etc., deflagrations and explosions occur again and again. The invention is therefore based on the task of making available a safe process that effectively avoids the explosions that endanger people and inflict great damage.

TEE is thermodynamically unstable, and decomposes with great reaction enthalpy into carbon and tetrafluoromethane. Under adiabatic and isochoric conditions, the initial pressure increases by 8- to 10-fold during the decomposition. That results in an explosion. However, the decomposition requires an ignition temperature of about 300° C. The invention is based on the knowledge that the explosions start from so-called "hot spots". These form from small amounts of floating dispersion coagulate. The coagulate is not wetted by water, a specific property of the PTFE, and therefore floats on the aqueous surface despite having a density of more than 2 g/cm$^3$. Under these conditions, the coagulate is exposed to an elevated TEE concentration in the gas phase, which causes the polymerization speed to accelerate while the cooling at the surface is decreased, and both of these effects lead to a heating of the coagulate above the ignition temperature of approximately 300° C. In conjunction with that, lumps can form in which the PTFE was not only melted, but is black in color as well (carbonized), as has been found following explosions. Temperatures above some 450° C. are required for carbonization.

One attribute of TEE polymerization is that the polymer chain radicals cannot terminate themselves because there is no chain transfer of the polymer in which a fluorine atom separates in order to form a terminal double bond. Consequently, the heat-generating radicals are fixed in place within the coagulate.

It has been found that in other processes in which the fluorinated radicals can terminate by means of a radical transfer reaction, "hot spots" do not occur, nor have explosions been observed. As a result, the task is carried out in accordance with the invention in that a substance is added to the gas phase of the polymerization vessel which sufficiently quickly carries away the locus of polymerization via radical transfer, as a result of which the ignition temperature is no longer reached in the floating coagulate.

In order to keep the formation of coagulate low, in accordance with U.S. Pat. No. 4,036,802 the reactor design was modified into a so-called horizontal design. This design provides more moderate mixing conditions, and, due to reduced shearing action, brings about a reduced tendency for coagulate to form.

With the E-process, it is known (from U.S. Pat. No. 2,965,595, for example), to add an anticoagulant that is supposed to surround formed coagulate and thus prevent further coagulation. To do this, 1 to 5 wt-% (relative to the aqueous medium) of a hydrocarbon that has more than 12 C atoms and is liquid during the polymerization is added. However, this substance must be removed from the product completely, since the smallest remnants lead to discolorations and ultimately to unuseful products. Since the hydrocarbon (paraffin wax or white oil) is added in relatively small amounts, it is present in droplet form during the polymerization. Thus it is not assured that forming coagulate will be embedded in the organic phase quickly enough and quantitatively. As a result, there were explosions with this process as well.

In contrast to that, a chain transfer in the gas phase reliably ensures, through termination of the polymer radical, that the ignition temperature will not be reached during polymerization. The developing of the floating coagulate into a hot spot is thus suppressed.

The substance that is added in accordance with the invention should not intervene substantially in the aqueous phase, that is, it should not have a substantial effect on the speed of polymerization and the product properties, which are characterized by mol weight and density. This substance must therefore be chosen in such a way that

- it is practically insoluble in water, and therefore exhibits practically no effective regulator activity in water,
- is not polymerizable aid is preferably saturated,
- is gaseous under polymerization conditions or has a vapor pressure >0.02 bar, and
- acts as a chain transfer agent (regulator) in the gas phase, so that floating coagulate does not trigger a spontaneous decomposition of the TEE.

In accordance with the invention, protection against explosions is provided without it being necessary to change recipes or equipments.

Emulsion polymerization of TEE is usually carried out at temperatures between 0 and 100° C. and TEE pressures between 5 and 30 bar.

Saturated fluorinated hydrocarbons that still contain hydrogen atoms and can additionally contain chlorine or ether bridges are generally well-suited. It is not critical whether the structure is linear, branched or cyclical. A general total formula for this "explosion inhibitor" is:

$F_xC_yH_zCl_nO_m$, where $y=2$ to 10, preferably 2 to 6

$m \leq 3$ $n \leq y/2+1$ $2 \leq z \leq 3/2y$ $x=2y+2-z-n$, and $x \geq 2$, preferably $x/n \geq 2$ The water solubility decreases with increasing level of fluorination, for example, in the series $CF_3$—$CH_3$>$CF_3$—$CF_2F$>$CF_3$—$CF_2$—$CH_2F$, increases when the fluorine is replaced by chlorine or hydrogen or by an ether bridge, so that compounds in which the number of fluorine atoms is markedly higher than the number of carbon atoms are preferred. A typical value for the water solubility is $1 \times 10^{-3}$ to $4 \times 10^{-3}$ mol/(1·bar), for example, $1.5 \cdot 10^{-3}$ mol/(1·bar).

Single hydrogen atoms on carbon, flanked by perfluorinated carbon atoms, generally do not regulate at polymerization temperatures. Compounds exhibiting $CH_3$ groups are strong chain transfer agents. For that reason, $CH_3$ groups on strongly fluorinated alcane residues are well-suited. Compounds with $CH_2$ groups are preferred.

The vapor pressure decreases with an increasing number of carbon atoms, and for that reason compounds with more than 6 carbon atoms generally exhibit volatilities that are too low.

Unsaturated compounds can polymerize into the polymer as a comonomer, and are thus removed from the gas phase and additionally disturb the crystalline PTFE structure, which is especially important in pasteware.

Basically, ether with the formula $C_aF_{2a+1}$—O—$CF_2$—$CFH_2$ where $a=1$ to 4 and cyclical ether can be used, but are hard to obtain with the required purity. $F_3C$—$CH_2$ F ("R134a") is especially preferred. $F_3C$—$CH_2$ F is commercially available, inexpensive and sufficiently pure ("polymerization grade"). The water solubility at room temperature is $1.5 \cdot 10^{-3}$ mol/(1·bar).

Depending on the apparent chain transfer strength in the aqueous phase, the partial pressure of the TEE of the polymerization, and the polymerization temperature, the partial pressure of the explosion inhibitor is set to between 2.5 mbar and about 0.5 bar, preferably up to 0.2 bar. The ratio of the partial pressure of the chain transfer agent to the partial pressure of the TEE is at least $1 \cdot 10^{-4}$, preferably at least $1 \cdot 10^{-3}$. High temperatures or strong chain transfer agents require lower partial pressures for the regulator, whereas higher partial pressures can be used at lower temperatures or with more weakly transfer agents. The upper limit of the partial pressure can easily be determined. All that needs to be done is to measure the density of the PTFE as a standard specific gravity (SSG) in a series of tests with increasing partial pressure of the chain transfer agents. An increase of the SSG value shows a chain transfer. The end properties of the PTFE will then be worsened.

The lower limit is difficult to determine. With S-polymerization in presence of <0.02 bar partial pressure perfluoro-(propylvinyl) ether (PPVE) and a TEE partial pressure of 10 bar, no explosions were observed despite the formation of lumps. PPVE is a regulator (U.S. Pat. No. 3,642,742). A lower limit may thus be estimated at about 0.005 bar.

The aqueous radical E-polymerization is carried out in a manner that is known in the art. Common water-soluble initiators such as persulfates or so-called redox systems come into consideration as the initiators. The permanganate system (U.S. Pat. No. 3,632,847) is preferred, since the oxidizing component of this redox system eliminates fluorinated hydrocarbons that get into the aqueous phase. As a result, a regulating action by these substances is avoided, which is particularly advantageous because, first, high-molecular PTFE is generated, and second, a deceleration of the polymerization is avoided as well. The explosion inhibitor should therefore be metered in during the polymerization, that is, fed to the polymerization vessel continuously or in steps as required.

It is known from U.S. Pat. No. 2,965,595 that hydrogen, methane, ethane or a saturated fluorinated hydrocarbon with no more than two carbon atoms and at least one hydrogen can be added during the polymerization of TEE. With the E-polymerization described there, however, only hydrogen and methane (in the presence of mineral oil) are used, while fluorinated hydrocarbons are used only in the S-polymerization. As the indicated density values of more than 2.22 show, relatively low-molecular products are created.

DE-A-41 39 665 pertains to E-polymerization of TEE using the addition of 1,1,2 trifluoroethane ("R134a"). Only a micropowder (MFI 0 to 0.5) is produced as a homopolymer PTFE. Under these conditions and with a partial pressure ratio R134a/TEE>0.4, R134a thus acts as a chain transfer agent in the polymerization medium. It was also found that because of its low chemical reactivity, this compound can act as an inerting agent at these high partial pressure ratios, and can thus prevent deflagrations.

However, in none of these documents can the knowledge that forms the basis for the invention be found, i.e., that what matters is providing a chain transfer in the gas phase, but not in the aqueous medium.

Along with the prevention of dangerous explosions that has already been mentioned, the invention also allows the use of larger polymerization vessels and the achieving of higher concentrations of solids. Thus it not only leads to the safety of the process, it also leads to substantial economic benefits as well.

EXAMPLES

The polymerization, its preparation and the measurements of the SSG per ASTM D 1457-66 are carried out as described in (US-A-4 391 940. The polymerization takes place in a 50-liter vessel boiler equipped with an impeller agitator and a baffle. The agitator speed is 200 rpm. The reactor is filled with 22 g of anunonium perfluoro octanoate dissolved in 31 liters of deionized water. The air is removed by alternately evacuating and pressing TFE, as is known in the state of the art. The vessel is pressurized to 13 bar with TFE. The temperature is set to 35° C. Pumped into the reactor are 15 mg $CuSO_4.12\ H_2O$ dissolved in 20 cm³ concentrated ammonia solution (28 wt-%), and a solution of 1.0 g $(NH_4)_2S_2O_8$ (ALPS). The polymerization is started by pumping in an aqueous solution of 0.5 g $Na_2S_2O_5$. Pressure and temperature are kept constant during the polymerization. The TFE consumption is measured with a flow meter. After 8.5 kg of TFE has been consumed, the charging of TFE is ended, the pressure is reduced through ventilation, and the vessel is evacuated and refilled with nitrogen. The evacuation and filling with nitrogen is repeated twice in order to remove remaining TFE. The resulting dispersion has a solids content of 22 wt-%. The ploymer resin that has formed is separated and dried, and its SSG determined.

In a series of tests, the partial pressure of R134a is varied per Table 1. The R134a is pressurized before the starter is added.

In a further series of tests, the initiator $KMnO_4$ is used in place of APS, while the rest of the conditions remain the same. The aqueous phase contains 22 g ammonium perfluoro-octanoate, 1.5 g oxalic acid and 10 mg $K_2S_2O_5$. The polymerization is sustained through the continuous charging of 30 mg $KMnO_4$ per liter with a charging ratio of 0.3 liters/h, Pressure and temperature (35° C.) remain constant during the polymerization. Once a solids content of 22 wt-% has been reached, the polymerization is ended, the PTFE resin isolated, and the SSG measured.

TABLE 1

| Number | PTFE | $P_{R134}$ | SSG |
|---|---|---|---|
| | | APS | |
| 1 | 13 | 0 | 2.162 |
| 2 | 13 | 0.1 | 2.163 |
| 3 | 13 | 0.3 | 2.175 |
| | | $KMnO_4$ | |
| 4 | 13 | 0 | 2.173 |
| 5 | 13 | 0.1 | 2.174 |
| 6 | 13 | 0.3 | 2.175 |

The invention claimed is:

1. A process comprising polymerizing tetrafluoroethylene wherein polymerizing is carried out in the presence of a saturated, practically non-water-soluble organic fluorinated compound having 2 to 10 carbon atoms at a partial pressure of the compound, and wherein the organic fluorinated compound has a water solubility of $1 \times 10^{-3}$ to $4 \times 10^{-3}$ mol/(1 bar) and is a saturated fluorinated hydrocarbon that comprises hydrogen atoms and the partial pressure of the organic fluorinated compound is between 2.5 mbar and 0.5 bar, and wherein the polymerizing is an explosion-free aqueous emulsion polymerization and leads to polytetrafluoroethylene that has a SSG density (ASTM D 1457-66) of less than 2.20 g/cm³ and is not melt-processable, and further wherein the organic fluorinated compound exhibits practically no effective regulator activity in water.

2. The process according to claim 1, wherein the organic fluorinated compound is a partially fluorinated hydrocarbon that contains chlorine or ether bridges.

3. The process according to claim 2, wherein the partially fluorinated hydrocarbon contains at least one $CH_2$ or at least one $CH_3$ group.

4. The process according to claim 2, wherein the partially fluorinated hydrocarbon is 1,1,1-trifluoroethane, 1,1,2-trifluoroethane or 1,1,1,2-tetrafluoroethane.

* * * * *

UNITED STATES PATENT AND TRADEMARK OFFICE
CERTIFICATE OF CORRECTION

PATENT NO. : 7,253,240 B2
APPLICATION NO. : 10/415250
DATED : August 7, 2007
INVENTOR(S) : Klaus Hintzer It is certified that error appears in the above-identified patent and that said Letters Patent is hereby corrected as shown below:

Column 1
Line 4, below "title" insert -- Description --.
Line 9, delete "TEE" and insert -- TFE --, therefor.
Line 40, delete "Pa.s" and insert -- Pa•s --, therefor.
Line 47, delete "Pa.s" and insert -- Pa•s --, therefor.
Line 48, delete "Pa.s" and insert -- Pa•s --, therefor.
Line 60, delete "(BP-A-0 664 209)" and insert -- "(EP-A-0 664 209)" --, therefor.
Line 61, delete "TEE" and insert -- TFE --, therefor.

Column 2
Line 3, delete "TEE" and insert -- TFE --, therefor.
Line 16, delete "TEE" and insert -- TFE --, therefor.
Line 26, delete "TEE" and insert -- TFE --, therefor.

Column 3
Line 13, delete "aid" and insert -- and --, therefor.
Line 18, delete "TEE" and insert -- TFE --, therefor.
Line 22, delete "TEE" and insert -- TFE --, therefor.
Line 23, delete "TEE" and insert -- TFE --, therefor.
Line 40, delete "x≥2,preferably" and insert -- x≥2, preferably --, therefor.
Line 45, delete "$CF_2F$" and insert -- $CH_2F$ --, therefor.

Column 4
Line 10, delete "TEE" and insert -- TFE --, therefor.
Line 15, delete "TEE" and insert -- TFE --, therefor.
Line 30, delete "TEE" and insert -- TFE --, therefor.
Line 54, delete "TEE" and insert -- TFE --, therefor.
Line 60, delete "TEE" and insert -- TFE --, therefor.
Line 65, delete "TEE>0.4" and insert -- TFE>0.4 --, therefor.

UNITED STATES PATENT AND TRADEMARK OFFICE
CERTIFICATE OF CORRECTION

PATENT NO. : 7,253,240 B2
APPLICATION NO. : 10/415250
DATED : August 7, 2007
INVENTOR(S) : Klaus Hintzer It is certified that error appears in the above-identified patent and that said Letters Patent is hereby corrected as shown below:

Column 5
Line 22, delete "anunonium" and insert -- ammonium --, therefor.
Line 28, delete "$CuSO_4.12\ H_2O$" and insert -- $CuSO_4 \bullet 12\ H_2O$ --, therefor.
Line 30, delete "(ALPS)" and insert -- (APS) --, therefor.
Line 40, delete "ploymer" and insert -- polymer --, therefor.

Column 6
Line 2, after "liters/h" delete "," and insert -- . --, therefor.

Signed and Sealed this

Twenty-third Day of December, 2008

JON W. DUDAS
*Director of the United States Patent and Trademark Office*